United States Patent [19]

Kawolics et al.

[11] Patent Number: 4,759,907
[45] Date of Patent: Jul. 26, 1988

[54] FEEDER DEVICE AND METHOD FOR ADDING SOLID MATERIAL TO A LIQUID OF VARIABLE FLOW RATE

[75] Inventors: Richard J. Kawolics, Euclid; Philip J. Zivich; Bonnie I. Nelson, both of Mentor, all of Ohio

[73] Assignee: ELTECH Systems Corporation, Boca Raton, Fla.

[21] Appl. No.: 925,356

[22] Filed: Oct. 31, 1986

[51] Int. Cl.[4] .................... C23F 11/08; B01D 12/00; E03B 11/02
[52] U.S. Cl. .................................. 422/7; 422/264 B; 422/278; 137/268
[58] Field of Search ................. 422/7, 19, 264, 264 B, 422/265, 276, 277, 285, 278; 210/198.1, 199, 752, 754–759; 137/268, 101.27; 4/226, 228, 231

[56] References Cited

U.S. PATENT DOCUMENTS

| | | | |
|---|---|---|---|
| 2,228,922 | 1/1941 | Gorlick | 422/278 |
| 2,588,691 | 3/1952 | Aske | 422/274 |
| 2,649,203 | 8/1953 | Hannibal | 137/268 |
| 2,874,032 | 2/1959 | Kuehner | 422/277 |
| 3,195,985 | 7/1965 | Elkin | 422/282 |
| 3,495,948 | 2/1970 | Long et al. | 23/272.7 |
| 3,595,786 | 7/1971 | Horvath et al. | 210/198 |
| 3,746,170 | 7/1973 | Bloom et al. | 210/198 |
| 4,117,560 | 10/1978 | Kidon et al. | 4/321 |
| 4,338,191 | 7/1982 | Jordan | 210/199 |

FOREIGN PATENT DOCUMENTS 1930773 1/1970 Fed. Rep. of Germany .......... 4/228

Primary Examiner—Barry S. Richman
Assistant Examiner—Timothy M. McMahon
Attorney, Agent, or Firm—John J. Freer

[57] ABSTRACT

A feeder device for controlled dissolution of a solid treating agent in a liquid of variable flow rate is designed such that the concentration of treating agent in the effluent liquid can be substantially constant, irrespective of the actual flow rate of the liquid. Further, the value of this concentration may be adjusted to varying levels and adapted to meet specific needs and requirements of the particular liquid system in which this feeder device may be employed. The constancy of concentration of the agent is obtained by the provision of a proportional weir, positioned in connection with a dissolution chamber, useful for maintaining a liquid volume in this dissolution chamber which can be linearly proportional to the flow rate of the liquid therethrough. In this liquid volume, dammed up by the weir, the solid treating agent, generally a substance containing hypochlorite, sulfite, sulphate or permanganate, can be present at least partly as a soluble solid. An amount of the agent not yet solubilized, proportional to the depth of the liquid, is contacted by and then dissolved in the liquid. Thus, the desired proportionality between this amount or the dissolution rate of the treating agent and the flow rate of the liquid is established.

42 Claims, 3 Drawing Sheets

FEEDER DEVICE AND METHOD FOR ADDING SOLID MATERIAL TO A LIQUID OF VARIABLE FLOW RATE

BACKGROUND ART

U.S. Pat. Nos. 3,595,786 and 4,338,191 disclose feeder devices comprising a dissolution chamber having a liquid-inlet and outlet, the liquid passing through this chamber thereby contacting a tableted treating agent stacked within cylinders with lateral openings exposing the treating agent to the liquid. An adjustable weir is arranged downstream of the cylinders, causing a certain degree of damming of the liquid within the dissolution chamber.

This adjustable weir is designed to provide an adjustable height of the liquid level within the dissolution chamber at a given flow rate and the concentration of the treating agent in the effluent liquid may be adjusted by positioning of the cylinders. At different flow rates the height of the liquid level in the dissolution chamber is obviously different, and the above patents contain no teaching how a proportional relationship between the flow rate and the amount of treating agent dissolved in the liquid may be established. Feeders such as disclosed in the above patents do not provide a constant concentration of treating agent in the treated liquid under varying flow rates of the liquid.

U.S. Pat. No. 4,117,560 discloses an apparatus for treating fluids in a closed circuit with treating agent comprising a chamber receiving the fluid flow, wherein holding means for the treating agent are provided permitting contact between the passing fluid and the treating agent during the passage of the liquid through the above mentioned chamber.

This apparatus comprises further a combination of an underflow weir and an overflow weir upstream from the holding means which combination of weirs has the purpose of inhibiting the entrance of floating and sedimented solids into the treating chamber. This weir combination does not control the liquid flow through the treating chamber and thus does not influence the dissolution rate of the treating agent in proportion to the flow rate.

U.S. Pat. No. 3,495,948 describes a bypass dissolver comprising two main chambers, one receiving a larger, untreated flow portion and the other one a minor flow portion wherein treating agent is dissolved during its passage in contact with a pervious magazine of treating agent.

This feeder is designed such that the flow rate of the smaller stream portion, in which the treating agent is dissolved, remains constant irrespective of the flow rate in the larger stream portion or the total flow rate. Thus, the dissolution rate of the treating agent is constant over time, independent of the total flow rate.

A feeder according to the above patent, therefore, does not provide constant concentration of the treating agent in the effluent liquid but only a timewise constant supply thereof in a liquid of varying flow rate.

U.S. Pat. No. 3,746,170 discloses a liquid-treating apparatus having a tank, wherein the liquid to be treated is kept at a constant level and containers with treating agent are immersed into said liquid at an adjustable immersion depth. Manual adjustment of these containers to control the immersion depth is required. A constant concentration of treating agent in the liquid passing through this apparatus may not be obtained therewith.

OBJECTS OF INVENTION

It is one of the objects of the present invention to provide a feeder device for adding solid material to a liquid of varying flow rate, wherein the concentration of the added material dissolved in the effluent liquid may be controlled in any desired manner. The preferred dependency of the concentration of the added material on the flow rate of the liquid is a constant concentration for any flow rate. Other dependencies such as an increase of the concentration of added material with increasing flow rate or others are also envisaged.

It is another object of the present invention to provide a method of dissolving a solid treating agent in a liquid of varying flow rate wherein the concentration of the treating agent in the effluent liquid is adjustable and independent of the flow rate of the liquid.

It is a further object of the present invention to design a feeder as mentioned above which may be used as a bypass in a gravity liquid-conduit or as an integrated unit receiving the entire liquid flow.

Other objects and advantages of the present invention will be apparent in the following detailed description of the invention and the appended claims.

SUMMARY OF INVENTION

The above objects of the invention are obtained with a feeder device for controlled addition of a treating agent to a flowing liquid of variable flow rate, wherein the outflow of the liquid from the feeder device is typically caused by gravity, the feeder comprising: a dissolution chamber between an inlet and an outlet for said liquid, said dissolution chamber comprising holding means for solid treating agent; at least one proportional weir between said inlet and said outlet; one proportional weir being located between said dissolution chamber and said outlet and being designed such that the amount of liquid present in the dissolution chamber is proportional to the flow rate of said liquid, thereby contacting with and dissolving in said liquid an amount of treating agent proportional to said flow rate; at least one proportional weir being adjustable or exchangeable to provide for a desired concentration of treating agent in the liquid leaving said feeder device. Although the feeder device is adapted for use wherein the outflow is caused by gravity, other outflow means are contemplated as useful for the present invention.

In one embodiment of the invention a single proportional, adjustable weir may be arranged between said holding means and said outlet, whereby the entire incoming liquid flows through the dissolution chamber, contacting and dissolving a desired amount of treating agent and passing through the proportional weir to leave the feeder via the outlet.

In another embodiment the feeder comprises a bypass leading to a dilution chamber arranged between the dissolution chamber and the outlet. In this embodiment the liquid is divided into a first and second stream, whereby the first stream is passed through the dissolution chamber as in the above first embodiment and subsequently enters the dilution chamber. The second stream enters the bypass and meets the first stream portion in the dilution chamber. Thus, in cases where only small concentrations of the treating agent in the effluent liquid are desired, the dissolution of the treating agent is limited to an adjustable portion of the entire liquid flow whereafter this portion is diluted with the rest of the liquid flow. To obtain a desired degree of dilution, said adjustable, proportional weir is arranged between said inlet and said bypass and a second proportional weir is provided between the dissolution chamber and the dilution chamber.

In this embodiment comprising a bypass and two streams, the adjustment of the ratio between the flow rates of the two streams may be controlled by the adjustable, proportional weir, situated between the entrance zone of the dissolution chamber and the bypass.

To inhibit erosion of the solid treating agent by mechanical forces of fast flowing or turbulent liquid around the holding means, the dissolution chamber comprises an entrance zone adjacent to the inlet and a dissolution zone, whereby the dissolution zone has an elevated bottom with respect to the entrance zone. The step formed by the difference in the levels of these two zones constitutes a baffle, provided that the liquid-inlet is arranged below the bottom level of the dissolution zone. This baffle provides smooth flow of the liquid around the holding means.

To further smooth the liquid flow in the dissolution chamber the kinetic energy of the incoming liquid may already be dissipated by a suitable design of the inlet. Thus the liquid conduit entering said entrance zone may be constituted by a tube comprising a closed end portion with lateral openings adjacent thereto. These openings may be arranged on the end portion of this tube in a position substantially facing said bottom of the entrance zone.

The outlet may be arranged at the bottom of the dilution chamber to completely evacuate the dissolution chamber during flow interruptions and thereby avoid the build-up of a saturated rest liquid in the dissolution chamber. For convenience of fabrication the bottom of the dilution chamber may be at the same level as the bottom of the entrance zone.

The holding means for the solid treating agent may comprise a known type of arrangement in the form of at least one hollow cylinder having lateral openings at its lower portion through which said liquid may contact the tableted treating agent stacked within said cylinder(s). In embodiments with more than one cylinder in the dissolution zone, these cylinders may be arranged such that even flow of the liquid around said cylinders is established.

These cylinders can have removable top covers which may be opened for recharging said cylinders with treating agent.

The proportionality between the depth of the liquid dammed up before the weir and the flow rate of the liquid is obtained by a weir which comprises at least one shutter plate arranged essentially perpendicular to the main flow direction of said liquid. Thereby, in the case of one single shutter plate, this plate may comprise an opening, or in the case of two or more shutter plates in the same plane these plates may define an opening between each other. This opening is essentially a vertical slit of varying width, progressively decreasing with increasing relative height along the slit. The weir may be adjusted by setting means for moving the shutter plates relative to one another, thereby varying the width of the opening.

Such setting means may, e.g., comprise two toothed racks, one connected to each shutter plate such that the teeth of the two racks oppose each other and a toothed wheel engaging both racks, the wheel and the racks being arranged such as to shift the shutter plates relative to one another upon rotation of the toothed wheel. Other methods to operate the proportional weir are within the skill of the expert in the art and are not detailed herein. The expression "proportional" as used herein should be construed as preferably relating to linear proportionality between the head on the weir and the discharge of the weir.

It will however be understood that weir exchangeability and adjustability can affect linear proportionality. Moreover, in the bypass mode, two weirs will be present. For any apparatus, the weir used in conjunction with the dissolution chamber will provide linear proportionality, but bearing in mind exchangeability and adjustability. Where such dissolution chamber weir is exchangeable, each individual weir used will be a linear proportional weir. Where an adjustable weir is used with the dissolution chamber, each setting of the adjustable weir will provide linear proportionality. In the bypass mode, the weir for the bypass chamber can be proportional and is preferably linearly proportional.

In the dilution chamber, the concentration of active ingredient can thus vary. Where only a dissolution chamber proportional weir is used, the active ingredient concentration in the dilution chamber will be subject to linear proportionality between the head on the weir and the discharge from the weir, so long as the weir is not replaced, i.e., in regard to a series of exchangeable weirs, or so long as the weir adjustment is not changed, in regard to an adjustable, proportional weir. When such exchange or adjustment takes place, a new linear proportionality will be established in accordance with the new weir or new weir setting. Such operation will thereby effect an incremental change in the active ingredient concentration in the dilution chamber. However, as flow rate varies with the new weir or weir setting, linear proportionality will be again established at such changed level. Also, it will be understood that dilution chamber concentration of active ingredient can change, when the bypass apparatus is used, depending upon the adjustment and exchanging of weirs for the bypass chamber.

The objective relating to the provision of a method by which solid treating agent may be dissolved in a flowing liquid of variable flow rate, such that the concentration of solid treating agent in the effluent liquid is independent from the flow rate of this liquid is obtained by a method comprising: passing said liquid through a dissolution zone wherein it is brought into controlled contact with said solid treating agent, restricting the flow of said liquid, thereby maintaining within said dissolution zone a desired amount of liquid in contact with a desired amount of said treating agent, and establishing a linear proportional relationship between the depth of liquid present within said dissolution zone, and discharge of liquid from said zone, thus dissolving the treating agent at a rate proportional to said flow rate.

In one embodiment of the above method the liquid is divided into a first and a second stream, whereby the first stream is passed through the dissolution zone and subsequently combined with the second stream bypassing the dissolution zone. The flow ratio between the first and second streams are kept at an adjustable, constant level under varying total flow rates.

BRIEF DESCRIPTION OF THE DRAWINGS

The invention is described in the following in more detail and with reference to several drawings, whereof

DETAILED DESCRIPTION OF THE DRAWINGS

Figure 1:
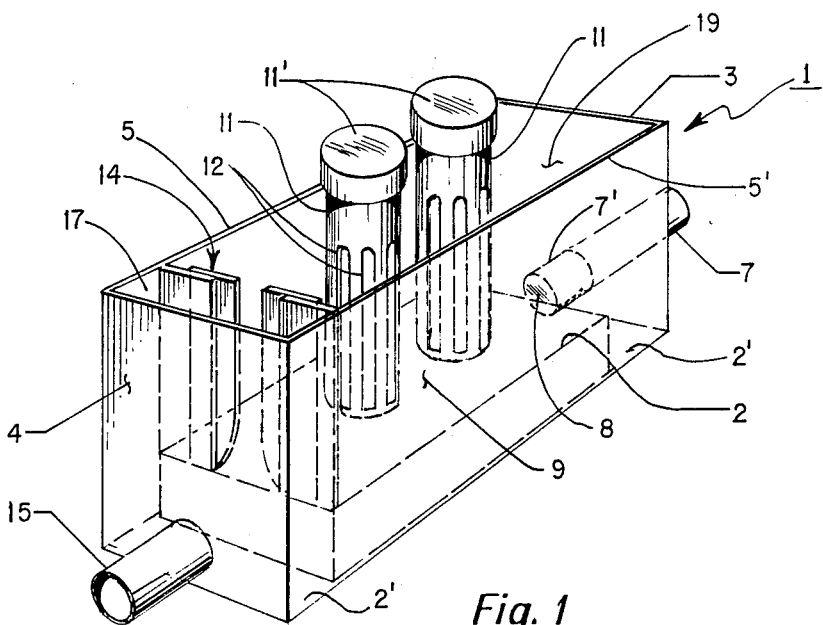
FIG. 1 is a perspective, schematic view of a feeder device according to the invention wherein the entire liquid flow passes through the dissolution zone.
Figure 2A:
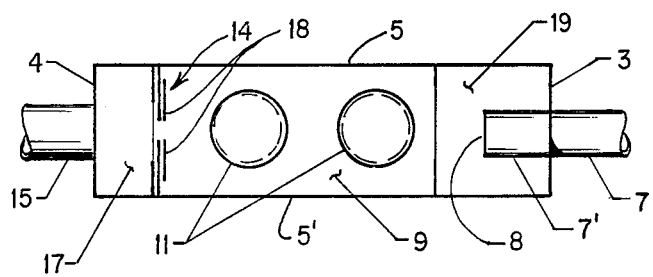
FIGS. 2a, b and c are schematic top, side and end views respectively of the feeder device of FIG. 1.
Figure 2B:
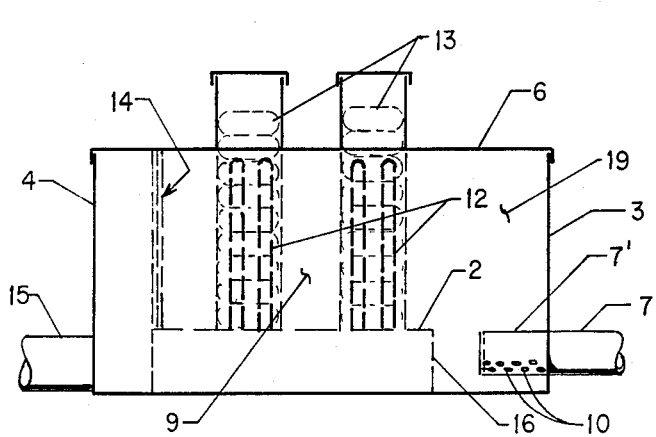
Figure 2C:
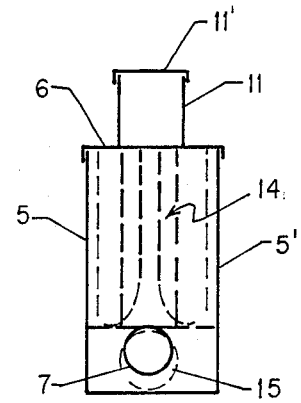

Referring now to FIG. 1 and FIGS. 2a, b and c, which illustrate a simple embodiment of the present invention, reference number 1 designates a housing of the feeder device comprising a bottom 2', a false bottom 2 extending over a part of the feeder device which will be designated in the following as dissolution chamber 9, a front wall 3, back wall 4, two side walls 5 and 5' as well as a cover 6 (shown in FIGS. 2b and 2c only). An inlet tube 7, penetrating the front wall 3, emerges into the entrance zone, or liquid inlet chamber, 19, the inlet tube 7 comprising an end portion 7', closed by a disc 8. Adjacent to said disc 8 on the periphery of the tube end portion 7' are lateral openings 10 through which liquid, flowing through tube 7, may enter the dissolution chamber 9. The lateral openings 10 are arranged on the end portion 7' of the tube 7 such that they essentially face the bottom 2' of the housing 1. The inlet tube 7 enters the front wall 3 below the level of the false bottom 2, so that the step 16 formed between the bottom 2' and the false bottom 2 constitutes a baffle for the liquid flow entering the housing 1 by the inlet tube 7. Likewise, the bottom 2 of the dissolution chamber is elevated in respect to the bottom 2' of the exit chamber 17, constituted between back wall 4 and weir 14, in order to completely evacuate the liquid from the dissolution chamber during no-flow periods.

The dissolution chamber 9 comprises holding means in the form of vertical cylinders 11 having longitudinal openings 12 at their lower portions. One, two, four or any reasonable number of such cylinders 11 may be arranged in the dissolution chamber 9 in any configuration that provides smooth flow of the liquid. Solid treating agent 13 for the liquid shown as stacked tablets within the cylinders 11, is exposed through openings 12 to the liquid present in the dissolution chamber 9. The cylinders 11 are closed at the top by covers 11' which may be removed for recharging of treating agent 13. The cylinders 11 penetrate the cover 6 of the housing 1 which, preferably, tightly closes the housing.

Figure 5:
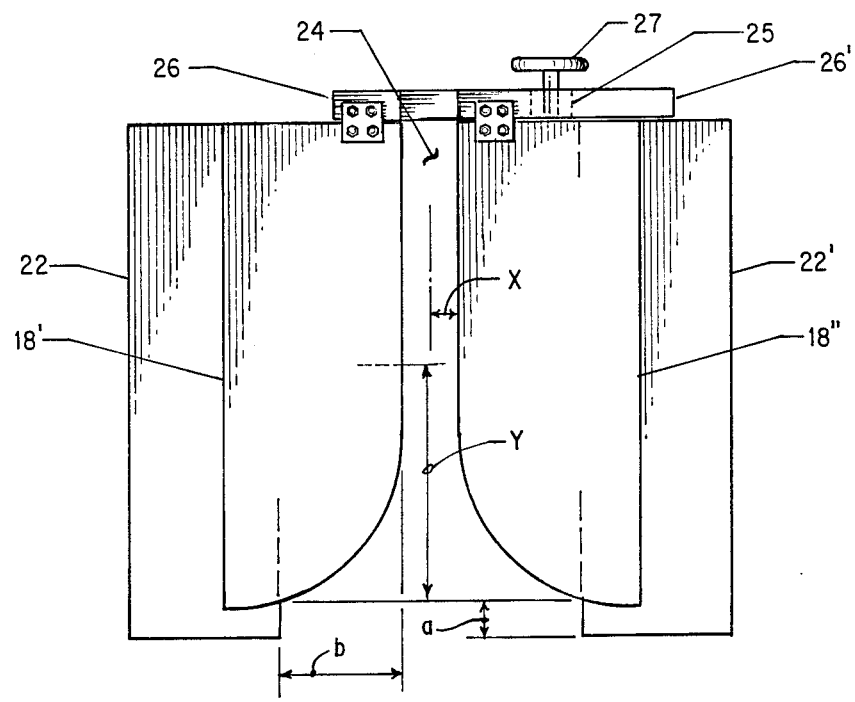
FIG. 5 is a schematic front view of an embodiment of the proportional weir.
Figure 6:
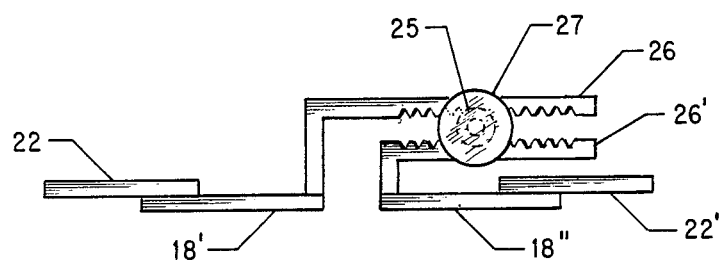
FIG. 6 is a schematic top view of the proportional weir of FIG. 5.

A proportional weir 14, the shape and function of which will be discussed below in connection with FIGS. 5 and 6, is arranged between the dissolution chamber 9 and the end wall 4 which comprises an opening for the outlet 15. The proportional weir 14, as indicated in FIGS. 1 and 2a is adjustable by movement of shutter plates 18 relative to each other.

The feeder as described above operates in the following manner. Liquid entering the dissolution chamber 9 through the lateral openings 10 of the end portion 7' of inlet tube 7 builds up before the baffle 16 and smoothly flows into the dissolution chamber 9. Here, the liquid comes into contact with the treating agent 13, shown stacked in the form of tablets, within the cylinders 11 and exposed to the liquid by the longitudinal openings 12. After flowing through the dissolution chamber 9, the liquid passes through the proportional weir 14 and enters the exit chamber 17 from where it leaves the feeder via the outlet tube 15.

The proportional weir 14 is designed such that it causes the liquid within the dissolution chamber 9 to build up to a depth proportional linearly, at a set adjustment or for a particular weir, to the discharge rate of liquid from the dissolution chamber 9. For convenience, this is often referred to herein as proportionality to the liquid flow rate. Thus, in linear relationship to the flow rate, the liquid level in the dissolution chamber 9 causes a number of tablets of the treating agent 13 in the cylinders 11, proportional to the liquid depth, to be wetted by the liquid and accordingly a proportional amount of this agent to be dissolved therein. For certain applications it may be desirable to provide well defined higher or lower dosage of treating agent at different flow rates. In such cases, the characteristics of the proportional weir can be used in combination with its exchangeable or adjustable character.

The effluent liquid passing through the outlet tube 15 comprises therefore treating agent in constant concentration, irrespective of the flow rate of the liquid, since the dissolution rate of the treating agent is increased or decreased in proportion to the flow rate of the liquid.

Referring more particularly to FIG. 1, the inlet tube 7 can be a series of tubes 7. The tube(s) 7 may enter the entrance zone, or liquid inlet chamber, 19 horizontally or vertically. The disc 8 at the end of the tube(s) 7 may be perforate, e.g., in the nature of a grill. It is to be understood that the inlet chamber 19 and dissolution chamber 9 can constitute an essentially continuous chamber demarcated therebetween by only the step 16. The step 16 or any elevations between the floors 2,2' can be a series of risers or a single step 16, and furthermore such may be canted from the vertical in whole or in part, all to assist a smooth liquid flow.

In the exit chamber 17, the outlet tube 15 can be operated in conjunction with or replaced by a floor drain. When the outlet includes a floor drain, it may drain downwardly from the exit chamber floor 2', and such floor 2' can be slanted toward the drain to assist in complete draining of the exit chamber 17. It is most advantageous for best reduction of turbulence that the distance from the fluid inlet, e.g., from the wall 3 in FIG. 1, to the step 16 be at least twice as long as the height of the step 16 e.g., a ratio of 2:1. Similarly the distance from the weir 14 to the outlet 15, e.g., to the back wall 4 in FIG. 1, should be at least twice the linear dimension as the linear dimension represented by the height of the false bottom 2 above the bottom 2'. Preferably for best reduction of turbulence, such dimensional relationship is 3:1 or more. Where a floor drain is used in the exit chamber 17, the distance for consideration should be from the drop off at the edge of the false bottom to the drain. It is furthermore most advantageous that the height of the fluid inlet be below the height of the false bottom 2. In this regard, it is preferred that any openings of a perforated inlet tube 7 be below such false bottom 2 height and most preferable that all perforations be through the lower half of the pipe circumference. Additionally, to enhance flow characteristics and/or prevent dead zones which might lead to non-uniform dosage of the treating agent in the liquid, there can be used baffles within the housing 1. The foregoing modifications and alternatives may also be useful for the assemblies as depicted in the FIGS. 3 and 4a, b and c.

Figure 3:
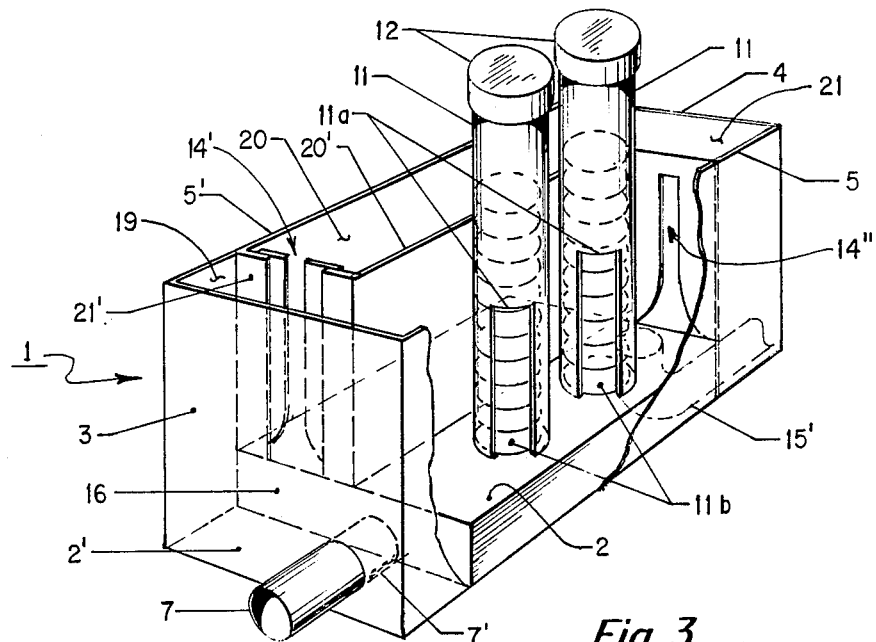
FIG. 3 is a perspective, schematic view of another embodiment of the invention wherein the total liquid flow is divided into a first and second stream, and wherein the feeder device comprises a bypass for a portion of the liquid not passing through the dissolution zone.
Figure 4A:
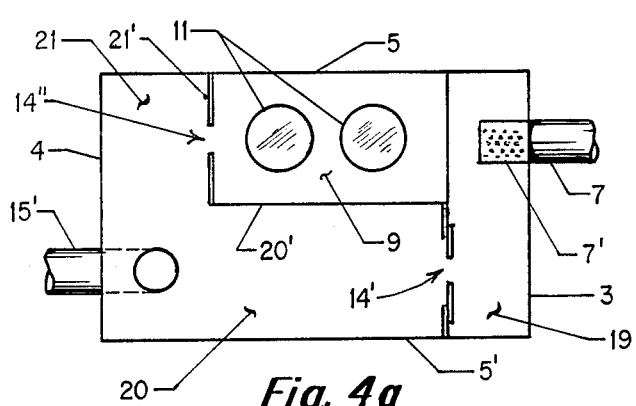
FIGS. 4a, b and c are schematic top, side and front views respectively of the feeder device of FIG. 3.
Figure 4B:
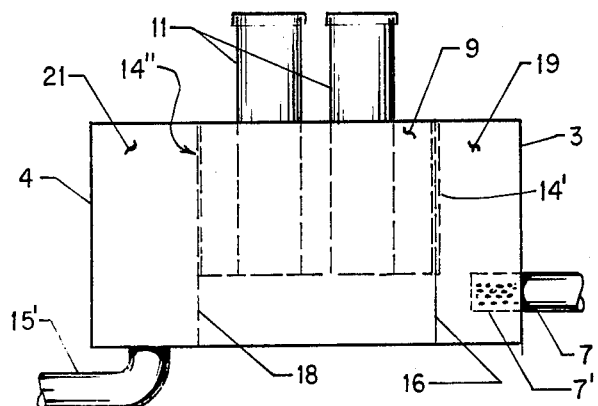
Figure 4C:
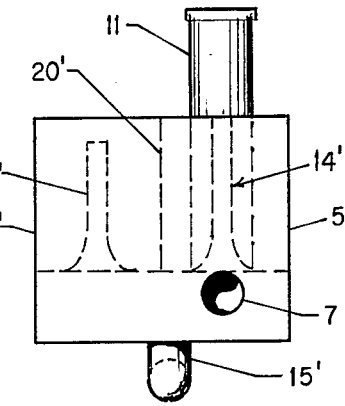

FIGS. 3 and 4a, b and c illustrate a second embodiment of the present invention whereby for convenience, members identical to those of the previously described Figures are designated with the same reference numbers. Reference numbers 2, 3, 4, 5 and 5' designate again the respective bottom and wall members of the housing 1 of a feeder according to the present invention. The housing 1 may also have a cover, not shown. The front wall 3 is traversed by an inlet tube 7 identical to the one described above. Again, the entry level of the inlet tube 7 is located lower than the level of the bottom 2 of the dissolution chamber 9. In flow direction before the dissolution chamber 9 the feeder device comprises an entrance zone 19 adjacent to the end portion 7' of the inlet tube 7; the bottom 2' of this entrance zone 19 being lower than the bottom 2 of the dissolution chamber 9. The step 16 formed by the difference in the levels 2, 2' of the bottoms of the entrance zone 19 and the dissolution chamber 9 constitutes a baffle for the dissipation of the kinetic energy of the incoming liquid.

The feeder as illustrated in FIGS. 3 and 4a comprises two main chambers, a dissolution chamber 9 identical to the one of the feeder illustrated in FIGS. 1, 2a, b and c, and, in addition to that, a bypass 20, leading to a dilution chamber 21. The dissolution chamber 9 is connected to the dilution chamber 21 by a non-adjustable proportional weir 14''. The bypass 20 is separated from the entrance zone 19 by a second proportional weir 14' which is adjustable. The separation between the dissolution chamber 9 and the bypass 20 is formed by a wall 20'. A wall 21' incorporating the above mentioned proportional weir 14'' separates the dissolution chamber 9 from the dilution chamber 21. An outlet tube 15' extends from the bottom 2' of the dilution chamber 21, this bottom 2' being lower than the bottom 2 of the dissolution zone for the purpose of complete evacuation of the dissolution chamber 9 during no-flow periods.

Two (or more) cylinders 11 are arranged within the dissolution chamber 9. These cylinders comprise lateral openings 11a through which solid treating agent 11b, shown as stacked tablets within the cylinders 11, is exposed to the liquid in the dissolution chamber 9.

The feeder device as illustrated in FIGS. 3 and 4a, b and c operates in the following manner. Liquid entering the entrance zone 19 of the dissolution chamber 9 builds up therein and loses its kinetic energy through the step 16 between the different bottom levels of the entrance zone 19 and the dissolution chamber 9. This incoming liquid is separated into two streams, one of which enters directly into the dissolution chamber 9, contacts and dissolves treating agent 11b stacked in the cylinders 11, and leaves the dissolution chamber 9 through the proportional weir 14'' over a drop wall 18 to enter into the dilution chamber 21. The other stream passes through the adjustable, proportional weir 14' to enter into the bypass 20 which leads directly into the dilution chamber 21.

The lower threshold of the weir 14' is situated at a level corresponding to the bottom level 2 of the dissolution chamber 9 to assure that liquid entering the feeder and building up in the entrance zone 19 begins to flow through the weir 14' at the same time as it enters the dissolution chamber 9 and thus the two streams are formed simultaneously.

By adjustment of the weir 14' a desired ratio between the flow rates of the two separate streams may be obtained. As described in connection with the simpler embodiment of FIGS. 1 and 2 the liquid leaving the dissolution chamber 9 has a constant concentration of treating agent, independent of the flow rate of the liquid.

In the present embodiment the first stream leaves the dissolution chamber 9 and also has a constant concentration of treating agent independent of the flow rate in the dissolution chamber 9. It is then recombined with the second stream in the dilution chamber 21. Since the ratio between the flow rates of both streams is constant and independent from the total flow rate, the factor of dilution of the treating-agent-containing stream by combination with the untreated stream is also constant, and the liquid comprising the two recombined streams contains therefore a constant concentration of treating agent, irrespective of the total flow rate.

By adjustment of the weir 14', however, the actual value of the ratio between the flow rates in the two separate streams, and therewith the degree of dilution in the dilution chamber 21 and finally the value of the constant concentration of treating agent in the liquid leaving the feeder device may be adjusted as desired.

In FIGS. 3, 4a, b and c the bottom of the bypass 20 corresponds to the bottom level of the entrance zone 19, however, liquid entering the bypass must first flow over the lower threshold of weir 14' to provide equal entrance conditions for both streams into the bypass 20 and the dissolution chamber 9 respectively. Turbulence of the liquid flow after the weir 14' created by the liquid flowing down the threshold behind the weir 14' may be desirable in the dilution chamber 21 to provide sufficient mixing of the two recombining streams. Additionally, further baffle means may be provided in the dilution chamber to enhance mixing of the two streams.

Comparing the two embodiments as illustrated in FIG. 1 and FIG. 3 respectively, it is to be noted that in the direct-flow embodiment according to FIG. 1 the weir 14 between the dissolution chamber 9 and the exit chamber 17 is a proportional and adjustable one. As discussed above, the proportionality of this weir 14 is necessary to provide a constant concentration of treating agent in the effluent liquid, irrespective of the flow rate through the dissolution chamber 9. The desired actual value of this concentration may be set by suitable adjustment of this weir 14.

In the other embodiment comprising the bypass 20, the adjustable weir 14' is the one arranged between the entrance zone 19 and the bypass 20. Thus, the desired value of the concentration of the treating agent in the effluent liquid may be adjusted by selecting a suitable ratio between the flow rates of the separate streams rather than by the damming effect of the weir 14'' downstream of the dissolution chamber 9.

The proportional weir 14'' in FIGS. 3, 4a, b and c may, therefore, as described, be non-adjustable. If the weir 14'' is also made adjustable, this may add to the convenience and accuracy of the setting of the desired concentration of the treating agent in the effluent liquid as the adjustability of the weir 14'' in addition to the adjustability of weir 14' provides a larger range of ratios between the first and second streams.

FIG. 5 illustrates an adjustable, proportional weir comprising two stationary, lateral wall portions 22 and 22', inner edges of which define the maximal weir opening, as well as two movable shutter plates 18' and 18". The opposing edges of the shutter plates 18, 18' are designed such that the horizontal distance between points at the same height along the vertical extension of the opening 24 defined between the two shutter plates 18', 18" decreases with increasing height along the opening 24. In order to provide proportionality between the flow rate and the vertical depth of the liquid damming up before passing through the weir, the exact shape of the edges follows a mathematical formula which may be expressed by:

$$x = b \cdot [1 - 2/\pi \cdot \arctan((y/a)^{0.5})],$$

whereby x is half the width of the weir at a given height y,
y is the considered height of the weir above a,
a is the distance from the bottom of the weir to the point where the curved parts of the shutter plates intersect the vertical inner edges of the stationary wall portions, and
b is half the distance between the inner edges of the stationary wall portions.

Other shapes of weirs following different mathematical formulae may be used in cases where different degrees of proportionality or any other dependency of the dosage from the flow rate is desired.

The illustrated weir further comprises a wheel 25 for driving the two shutter plates 18', 18" in a relative movement to each other. A possible simple mechanism leading to such relative movement upon rotation of the wheel 25 is illustrated in FIG. 6.

FIG. 6 is a top view of the above described adjustable, proportional weir, comprising the two stationary lateral wall portions 22 and 22' as well as the two shutter plates 18' and 18". Toothed racks 26 and 26' are connected with the shutter plates 18' and 18" and arranged in such a manner that the teeth of the two racks 18', 18" oppose each other at a distance corresponding to the diameter of a toothed wheel 25, thereby engaging said wheel 25. Thus upon rotation of the toothed wheel 25 by means of a handling wheel 27 the two racks 26 and 26' are moved in opposite directions causing relative movement of the shutter plates 18 and 18" towards or away from each other. Such relative movement results in an enlargement or in a restriction of the opening 24 of the proportional weir 14 or 14'.

It is to be understood that other methods of physically or mechanically adjusting the width of the weir are obvious for those skilled in the art and that the means for said adjustment as illustrated in FIGS. 5 and 6 should not be construed as limiting the scope of the present invention. Moreover, exchangeable weir plates may also be useful. By this it is meant that a proportional weir with a fixed shape to its opening can be removed and exchanged with a different weir having a different fixed shape opening. Thus, for example, adjustable plates of FIGS. 5 and 6 can be replaced by using exchangeable weirs, which can typically be simply slid in and out of slots positioned for receiving such exchangeable weirs, with there being a series of such weirs having gradually widening or narrowing openings, going from weir to weir. Although the foregoing discussions have referred to the solid treating agent in tableted form, it is to be understood that other solid forms, e.g., granules, are contemplated as being useful in the present invention. Depending on the specific use of the feeder device, these solid particulates of treating agent may be one or more of any of those organic and/or inorganic substances useful in the art. Among various possibilities there can be included substances such as hypochlorites, e.g., the alkaline earth metal hypochlorites including calcium hypochlorite, sulfites as exemplified by sodium sulfite, sulfates such as ferrous sulfate, permanganates, e.g., potassium permanganate and various of the corrosion inhibiting substances as are useful in water treatment.

The present invention has been described in the foregoing with reference to embodiments constituting examples only, without limiting the invention thereto. Numerous modifications of the actual embodiments, some of which have been referred to in the discussion hereinabove, may be carried out without departing from the scope of the present invention.

In particular modifications may be made in the shapes and dimensions of the various components of a feeder according to the present invention including variations in the ratio between the size of the dissolution chamber and that of the dilution chamber. Modifications also comprise the use of various feed materials, which by way of example was referred to as treating agent according to a preferred use only, and which, in fact, may by any solid material to be added to a flowing liquid. The use of a feeder according to the present invention is contemplated either as a bypass device on a liquid circuit or as an integrated device receiving the total flow of the circuit.

The invention is further illustrated by an example according to an actual embodiment. The example is presented by way of illustrating the invention and should not be construed as a limitation thereof.

EXAMPLE

A feeder device according to FIG. 3 was built with a length of the side walls 5 and 5' of 73.7 cm (29 inches), a length of the front and back walls 3,4 of 36.2 cm (14.25 inches) and a height of all walls of 25.4 cm (10 inches). The height of the bottom 2 of the dissolution chamber 9 and the bypass chamber 20 above the bottom 2' of the entrance zone 19 and the dilution chamber 21 was 7.6 cm (3 inches). The distance from the front wall 3 to the step 16 was 12.7 cm. (5 inches) and the distance from the non-adjustable proportional weir 14" to the back wall 4 was 15.24 cm. (6 inches). The bypass chamber 20 and dissolution chamber 9 were of equal width and length dimensions. Two proportional weirs 14',14" were used and were positioned as shown in FIG. 3. The shape of the weir edges followed the mathematical formula $x \cdot y = k$. In this case the element "a" from the earlier-presented formula was only about 0.3 cm (0.125 inch) and was therefore ignored for purposes of the formula followed for the outline of the weir. In the equation used, x is half the width of the weir at a given height y, and y is the considered height of the weir above its lowest point. In the equation k is a constant that is selected according to flow rate considerations. For the linear proportional weir used in this example, k=0.0242.

The feeder was tested with tap water and controlled-dissolve-rate tablets known to contain calcium hypochlorite active ingredient. The tablets were stacked in 7.62 cm. (3 inches) diameter tubes and used under tap water flow rates in a range from 22.7–132.5 liters (6–35 gallons) per minute through the feeder. It was found that the concentration of treating agent in the effluent liquid was essentially constant at a level of 4.3 ppm when two feed tubes were used and of 2.2 ppm when only one feed tube was used. The constancy of the concentrations over the full range of flow rates was better than 15%, i.e., 4.3±15% and 2.2±15%.

We claim:

1. A feeder device for controlled addition of a treating agent to a flowing liquid of variable flow rate, wherein the device is adapted for the outflow of the liquid from the feeder device by gravity, the feeder comprising:

a housing element having a longitudinal axis for temporarily confining a flowing liquid;

a liquid inlet means and a liquid outlet means in said housing element;

a dissolution chamber within said housing element between said inlet means and outlet means, said dissolution chamber having an elevated bottom and comprising holding means for solid treating agent;

an entrance zone having a bottom and being located between said inlet means and said dissolution chamber;

raised surface means rising from said entrance zone to said dissolution chamber and providing an inlet flow baffle, said raised surface means extending from said entrance zone to said dissolution chamber elevated bottom;

at least one proportional weir between said inlet means and said outlet means including a proportional weir located between said dissolution chamber and said outlet means and being designed such that the amount of liquid present in the dissolution chamber in proportional to the flow rate of flowing liquid, thereby contacting with, and dissolving in the liquid an amount of treating agent proportional to its flow rate;

and with the weir being consturcted so as to be adjustable or exchangeable to provide for a desired concentration of treating agent in the liquid leaving said feeder device.

2. The feeder of claim 1, wherein there is contained in said holding means one or more one or more solid organic or inorganic treating agent, with the inorganic agent being selected from substance containing hypochlorite, sulfite, sulphate, permanganate, or mixtures of the foregoing.

3. The feeder of claim 1, wherein the holding means is comprised of at least one hollow cylinder having one or more lateral openings at a lower portion thereof through which liquid may contact said solid treating agent contained within said cylinder.

4. The feeder of claim 3, wherein the holding means comprises removable top cover for recharging said cylinder with treating agent and the bottom of said holding means rests upon the floor of said dilution chamber.

5. The feeder of claim 1, wherein said porportional weir is an adjustable weir which comprises at least one shutter plate arranged essentially perpendicular to the longitudinal axis of said housing element, said at least one shutter plate having an opening for the passage of said a liquid, said opening being essentially a vertical slot of varying width, progressively decreasing in width with increasing relative height along said slot.

6. The feeder of claim 5, wherein said proportional weir comprises two shutter plates arranged in one plane, and setting means for adjusting the distance of said shutter plates to one another.

7. The feeder of claim 6, wherein said setting means comprises two toothed racks, one connected to each shutter plate such that the teeth of said two racks oppose each other, and a toothed wheel engaging both racks, said wheel and said racks being operatively connected to shift said shutter plates relative to one another upon rotation of said toothed wheel.

8. The feeder of claim 1, wherein said device includes a dilution chamber while having said dissolution chamber located between said dilution chamber and said entrance zone, with said dissolution chamber having an elevated bottom with respect to said entrance zone and dilution chamber, with the ratio of the distance across the entrance zone to the height of said elevated bottom being at least 2:1.

9. The feeder of claim 8, wherein the distance across the entrance zone is the distance from an outlet end of the liquid inlet means to the beginning of the elevated bottom.

10. The feeder to claim 8, wherein the ratio of the distance across the dilution chamer to the height of the elevated bottom is at least 2:1.

11. The feeder of claim 10, wherein the distance across the dilution chamber is the distance from an outlet end to the end of the elevated bottom.

12. The feeder of claim 1, further comprising a dilution chamber within said housing element, a channel means within said housing element arranged to provide a bypass leading to said dilution chamber, said channel means being arranged between said inlet means and said outlet means so that liquid flowing through said housing element is divided into first and second streams, the first stream passing through said dissolution chamber before entering said dilution chamber and the second stream entering the channel means providing said bypass, said at least one weir further including a second proportional weir arranged between said inlet means and said outlet means in said bypass, said second proporitonal weir being constructed so as to be adjustable.

13. The feeder of claim 12, wherein the proportional weir located between the dissolution chamber and the outlet means is contructed so as to be adjustable for providing variations in the proportionality between the amount of liquid in the dissolution chamber and the liquid flow rate.

14. The feeder of claim 3, wherein said outlet means is arranged at the bottom of said dilution chamber.

15. The feeder of claim 12, wherein said weir between said inlet means and said bypass rests on the bottom of said dissolution chamber.

16. The feeder of claim 15, wherein said inlet means is positioned below the bottom of said dissolution chamber.

17. The feeder of claim 15, wherein said inlet means is comprised of a tube entering said entrance zone, said tube comprising a closed end portion and lateral openings adjacent thereto, said lateral openings being arranged on said end portion of said tube in a position substantially facing said bottom of said entrance zone.

18. The feeder of claim 15, wherein said outlet means is arranged at the bottom level of said dilution chamber.

19. The feeder of claim 18, wherein the bottom of said dilution chamber is at a level corresponding to the bottom level of said entrance zone.

20. A method of adding solid treating agent to a flowing liquid of varying flow rate, comprising:

feeding said liquid of variable flow rate to a feeder device entrance zone flowing said liquid form said entrance zone over a flow baffle extending from said entrance zone to a dissolution chamber passing said liquid through said dissolution chamber wherein it is brought into controlled contact with a solid treating agent;

restricting the flow of said liquid through said dissolution chamber; and establishing a linearly proportional, adjustable relationship between the depth of liquid present within said dissolution chamber and the discharge amount of liquid from said chamber, thus dissolving said treating agent at a rate proportional to said flow rate.

21. The method of claim 20, wherein the liquid is divided into a first and a second stream, said first stream being passed through said dissolution chamber and subsequently combined wiht said second stream that is bypassing said dissolution chamber, the flow ratio between said first and second stream being kept substantially constant at varying total flow rates.

22. The method of claim 20, wherein said steps of establishing a linearly proportional, adjustable relationship and restricting said flow of said liquid through said dissolution chamber includes flowing said liquid through a proportional weir.

23. In a feeder assembly for controlled addition of a treating agent to a flowing liquid of variable flow rate, wherein said assembly has a housing element for temporarily confining a flowing liquid, which housing element includes liquid inlet means, liquid outlet means, a dissolution chamber containing holding means for solid treating agent and said assembly includes at least one weir, the improvement in said assembly which comprises a liquid inlet zone having a floor, within said housing element, which floor is at a first level for said assembly and said liquid inlet zone, said dissolution chamber having a floor at a second level, with said second level dissolution chamber floor being above said assembly floor, and including a raised surface means between floors providing a flow baffle, and with said at least one weir including a weir positioned between said dissolution chamber and said outlet means, which weir is a proportional weir.

24. The feeder assembly of claim 23, wherein said raised surface means includes at least one step between said assembly floor and said dissolution chamber floor.

25. The feeder assembly of claim 23, wherein said raised surface means includes at least one step extending upwardly to the threshold of the weir.

26. The feeder assembly of claim 23, wherein said proportional weir is constructed to be linearly proportional and is positioned between said dissolution chamber and said outlet means.

27. The feeder assembly of claim 23, wherein the ratio of the distance across the floor of said liquid inlet chamber to the height between the floors is at least 2:1.

28. In a feeder assembly for controlled addition of a treating agent to a flowing liquid of variable flow rate, wherein said assemby has a housing element for temporarily confining a flowing liquid, which housing element includes liquid inlet means, liquid outlet means, a dissolution chamber containing holding means for solid treating agent and said assembly includes at least one weir, the improvement in said assembly which comprises a liquid inlet zone having a floor within said housing element which floor is at a first level for said assembly and said liquid inlet zone, said dissolution chamber having a floor at a second level, a bypass chamber within said housing element between said liquid inlet zone and said liquid outlet means and having a floor at said second level, said bypass chamber floor being above said assemby floor and with said assemby including a raised surface means between floors providing a flow baffle.

29. The feeder assembly of claim 28, wherein said raised surface menas includes at least one step between said assembly floor and said bypass chamber floor.

30. The feeder assembly of claim 28, wherein said raised surface mens includes at least one step extending upwardly to the threshold of the weir.

31. The feeder assembly of claim 28, wherein a linearly proportional weir is positioned in assembly adjacent said dissolution chamber.

32. In a feeder assembly for controlled addition of a treating agent to a flowing liquid of variable flow rate, wherein said assembly has a housing element for temporarily confining a flowing liquid, which housing element includes liquid inlet means, liquid outlet means, a dissolutin chamber containing holding means for solid treating agent and said assembly includes at least one weir, the improvement in said assembly which comprises a liquid inlet zone within said housing element, a dissolution chamber within said housing element between said inlet means and outlet means, said at least one weir incuding a proportional weir positioned adjacent said dissolution chamber a with there being as said liquid inlet means a perforate, elongated liquid inlet element extending into said liquid inlet zone, and with there being a raised surface means flow baffle extending between said inlet zone and said dissolution chamber.

33. The feeder assembly of claim 32, wherein said liquid inlet element is positioned in said inlet chamber upstream from said proportional weir.

34. The feeder assembly of claim 32, wherein said liquid inlet element comprises a perforate inlet tube having an at least partially blocked end, with said tube being positioned in said inlet zone above a floor of said zone.

35. The feeder assemby of claim 32, wherein said liquid inlet element extends horizontally into said liquid inlet zone.

36. The feeder assembly of claim 32, wherein said inlet zone has a floor, said dissolution chamber has a floor above said inlet zone floor and said liquid inlet element is positioned below said dissolution chamber floor.

37. The feeder assembly of claim 32, comprising a bypass chamber leading from said inlet chamber to a dilution chamber.

38. In a feeder assembly for controlled addition of a treating agent to a flowing liquid of variable flow rate, wherein said assembly has a housing element for temporarily confining a flowing liquid, which housing element includes liquid inlet means, liquid outlet means, a dissolution chamber containing holding means for solid treating agent, the improvement in said assembly which comprisies a liquid inlet zone having a floor within said housing element, which floor is at a first level for said assembly and said liquid inlet zone, a dissolution chamber with a floor at a second level, with said dissolution chamber floor being above said assembly floor, a raised surface means flow baffle between said floors and with the ratio of the distance across the inlet zone to the height of the raised surface means between the floor levels being at least 2:1.

39. The feeder assembly of claim 38, wherein said ratio is at least 3:1.

40. The feeder assembly of claim 38, comprising a bypass chamber having a floor at said second level and leading from said inlet chamber to a dilution chamber.

41. The feeder assembly of claim 38, wherein said dissolution chamber leads to a dilution chamber having a floor at said first level.

42. The feeder assembly of claim 41, wherein the ratio of the distance across the dilution chamber to the height between floor levels is at least 2:1.

* * * * *